April 19, 1960 W. C. PULVER 2,932,928
MACHINE FOR REMOVING COVERS FROM CONTAINERS
Filed Nov. 5, 1957 6 Sheets-Sheet 1

INVENTOR.
WILLIS CLARK PULVER

FIG. 3

INVENTOR.
WILLIS CLARK PULVER

April 19, 1960
W. C. PULVER
2,932,928
MACHINE FOR REMOVING COVERS FROM CONTAINERS
Filed Nov. 5, 1957
6 Sheets-Sheet 4
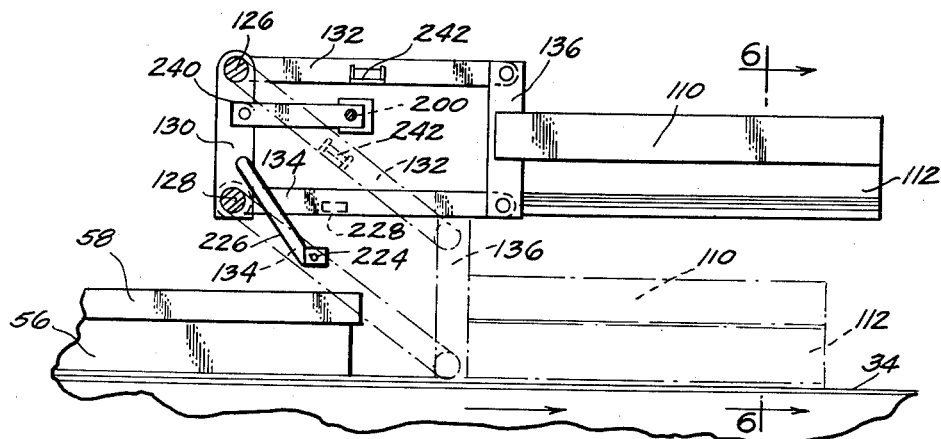
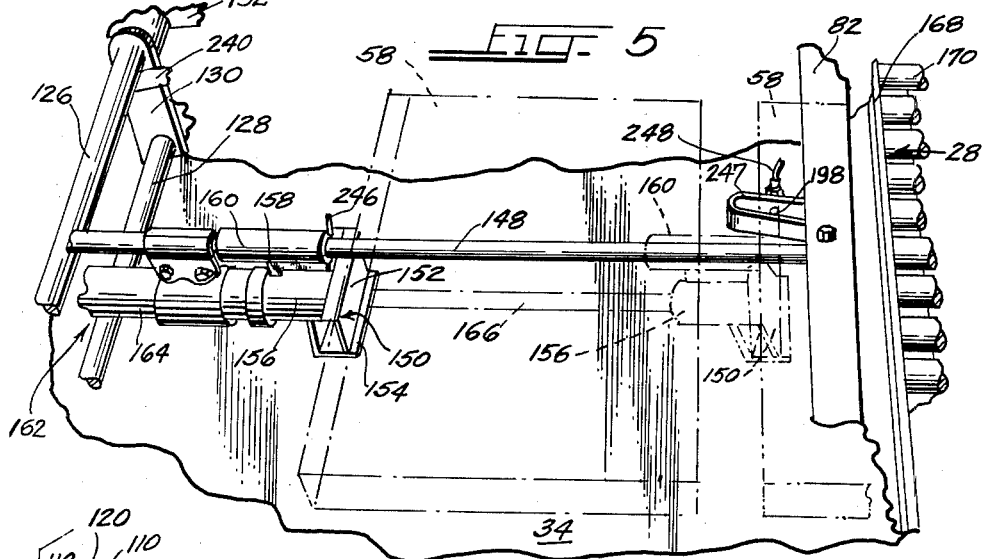
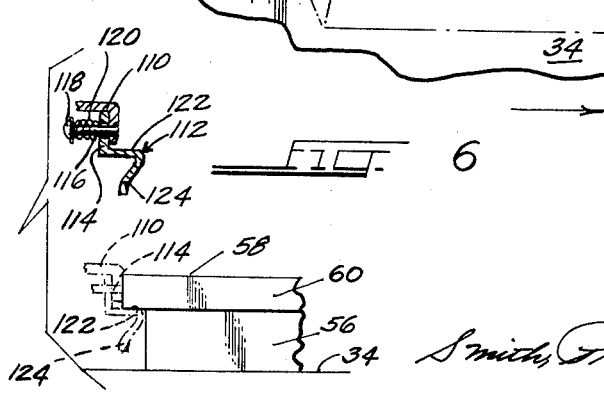
INVENTOR.
WILLIS CLARK PULVER
BY
Smith, Frangley, Baird and Clayton
ATT'YS.

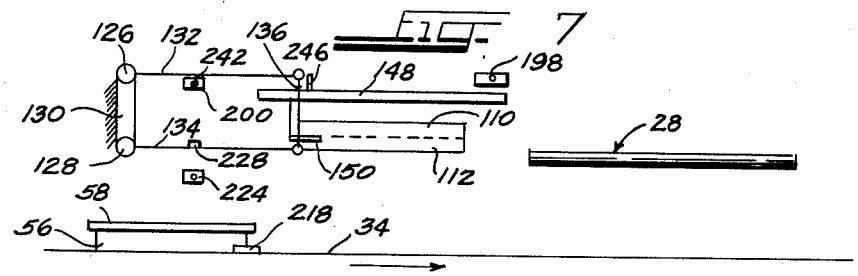
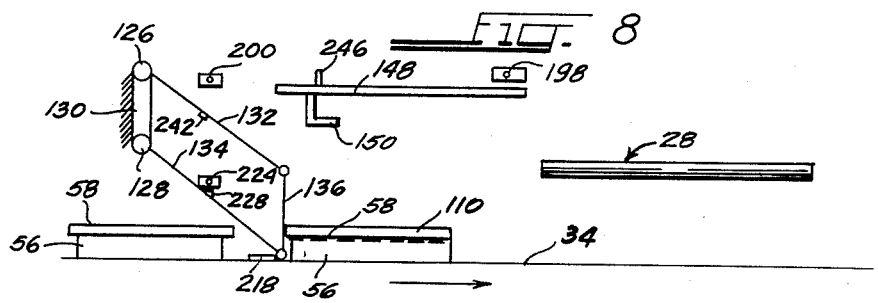
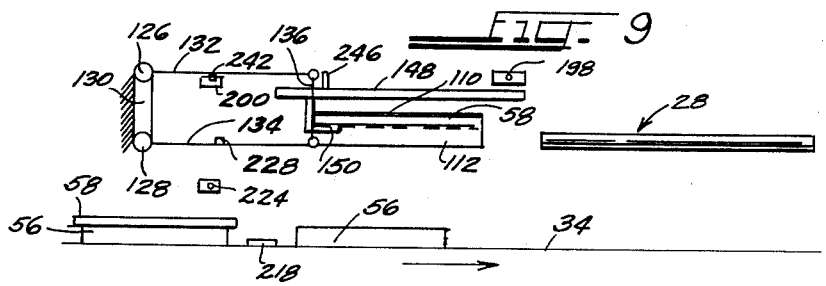
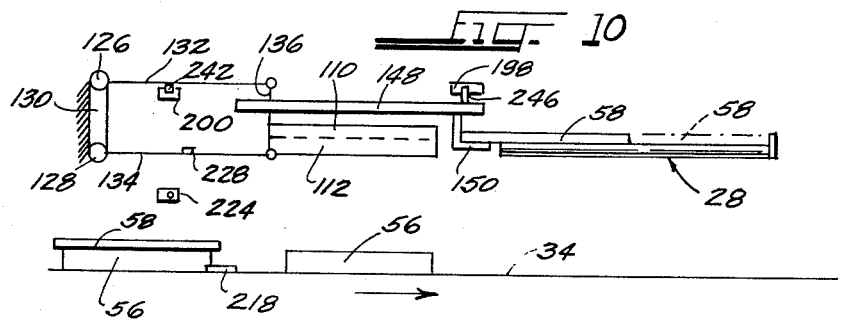

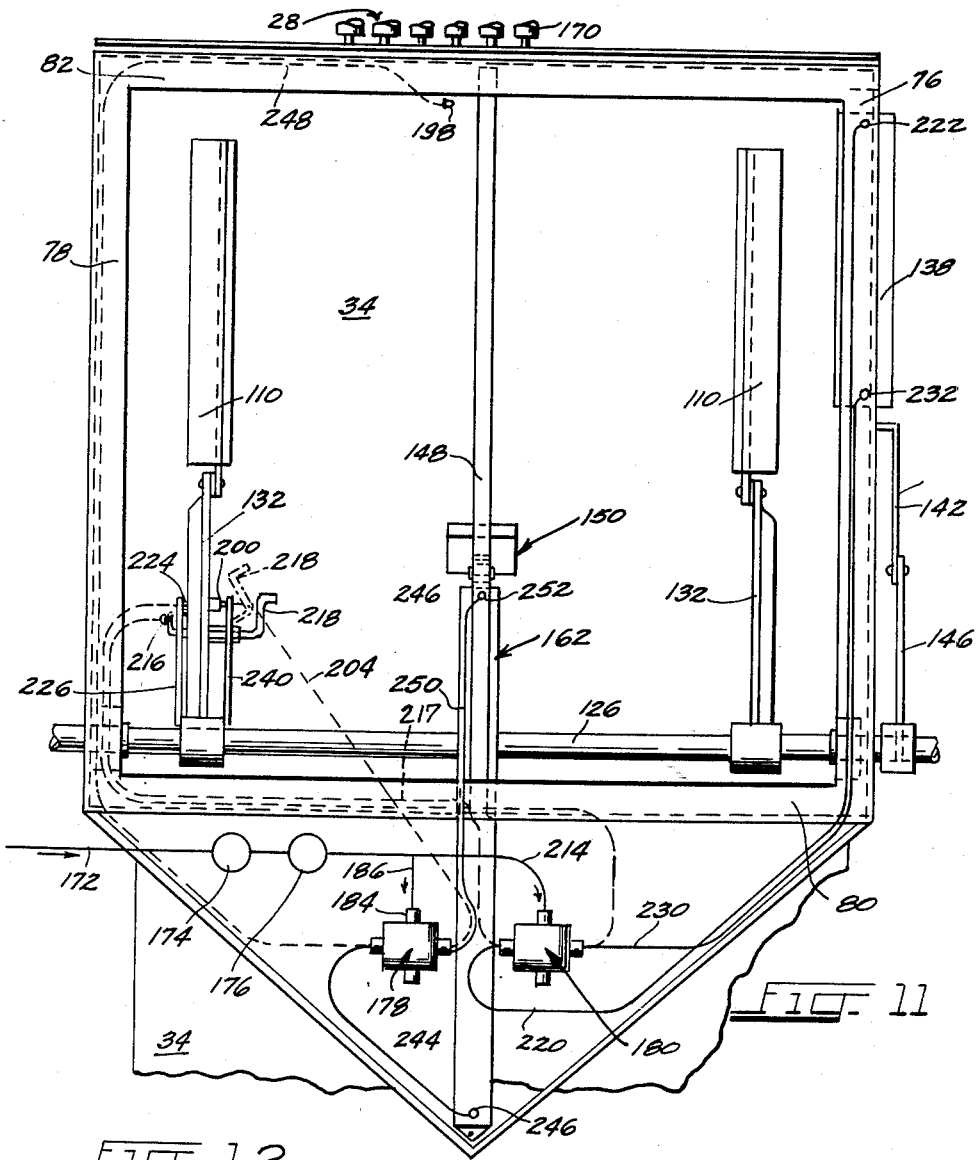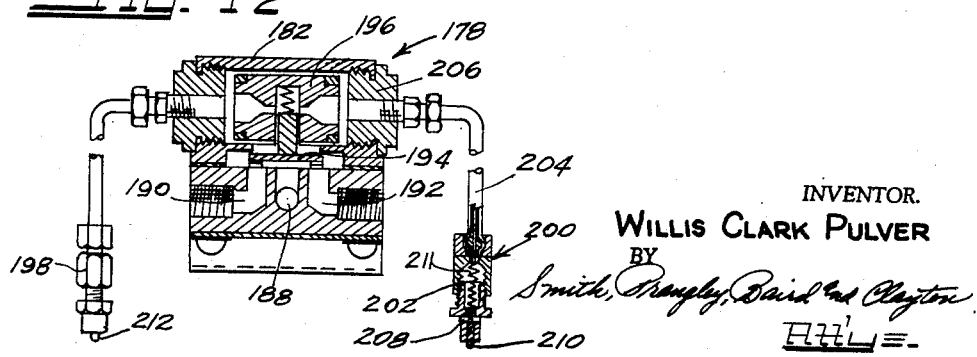

United States Patent Office 2,932,928
Patented Apr. 19, 1960

2,932,928

MACHINE FOR REMOVING COVERS FROM CONTAINERS

Willis Clark Pulver, Oak Lawn, Ill., assignor to Velten & Pulver Inc., Chicago, Ill., a corporation of Illinois Application November 5, 1957, Serial No. 694,612

17 Claims. (Cl. 53—67)

This invention relates to article handling mechanisms and methods, and particularly to automatic machines and methods for removing covers and lids from containers.

Loaves of bread of the pullman or sandwich style are baked in bread pans that can accommodate several loaves, such as for example four loaves. In order to obtain the desired flat top on the bread loaves whereby to provide a substantially square cross section, the bread pans are provided with covers or lids which are positioned thereon during the baking operation to provide the flat upper surface of the loaves. In order to preserve the freshness of the loaves it is desirable that the loaves be handled and preferably wrapped while hot. Accordingly, it is necessary to remove the loaves from the baking pans while the pans and the bread therein are still hot. The first step in removing the loaves from the baking pans is to remove the lid from the pan. Systems utilized heretofore to remove lids in the hot condition have been cumbersome and expensive to operate.

Accordingly, it is an important object of the present invention to provide an improved machine for removing lids from containers such as bread baking pans.

Another object of the invention is to provide a machine of the type set forth which can handle the pan and lids when these parts are still hot and which can remove the lid from the pan rapidly whereby to facilitate speedy discharge of the loaves from the hot pan.

Yet another object of the invention is to provide a machine for removing lids from containers, the machine being fully automatic in operation.

In connection with the foregoing object it is another object of the invention to provide a machine of the type set forth which can remove the lid from a pan while the lid and pan are moving on a continuous conveyor, the removal of the lid being accomplished without interruption of the movement of the pan and its contents.

Still another object of the invention is to provide a machine which can more rapidly remove lids from pans and which lifts the lid forwardly and upwardly away from the pan while the pan is in continuous movement on a conveyor.

Yet another object of the invention is to provide a lid removing machine of the type set forth which is positive and effective in use.

Still another object of the invention is to provide a machine for removing lids of the type set forth in which the pan and lid receiving parts are adjustable whereby to accommodate a wide range of sizes of pans and lids.

A further object of the invention is to provide a machine for lifting lids from pans in which the lifting arms are so constructed that they can tolerate relatively wide variations in shapes of lids of supposedly the same basic size without manual adjustment thereof.

A still further object of the invention is to provide in a machine for removing lids from pans guide mechanism to insure that the pans and the lids are in alignment with the lid lifting arms.

In conjunction with the foregoing object it is another object of the invention to provide a guide mechanism of the type set forth which is adjustable whereby to accommodate a wide range of pan and lid sizes.

A still further object of the invention is to provide in a lid removing machine of the type set forth an improved lid lifting mechanism which maintains the lid in a substantially horizontal position during the lifting thereof whereby to facilitate transfer to a lid conveying system.

These and other objects and advantages of the invention will be better understood from the following description when taken in conjunction with the accompanying drawings. In the drawings wherein like reference numerals have been utilized to designate like parts throughout:

Fig. 3 is a perspective view looking down upon the machine of Fig. 1 from the feed end thereof;

Fig. 4 is a fragmentary enlarged view in vertical section substanitally as seen in the direction of the arrows along the line 4—4 of Fig. 3;

Fig. 5 is an enlarged fragmentary view illustrating in particular the mechanism to shift removed lids onto the lid conveying system;

Fig. 6 is a fragmentary view in vertical section substantially as seen in the direction of the arrows along the line 6—6 of Fig. 4;

Fig. 7 is a diagrammatic view similar to Fig. 4, illustrating the position of the lid handling parts as a pan with a lid thereon is first moved into contact with an operation control member, the lid lifting arms being shown in the upper lifted position;

Fig. 8 is a diagrammatic view similar to Fig. 7 showing the parts in the position assumed after the pan with the lid on it has actuated the operation control member and the lifting arms have been moved downwardly to engage below the lid in preparation for lifting thereof;

Fig. 9 is a view similar to Fig. 7 illustrating the position of the parts with the lid moved upwardly and forwardly away from the associated pan, the lifting arms being shown in their uppermost position;

Fig. 10 is a diagrammatic view illustrating the position of the parts during movement of the lifted lid from the lifting arms onto a lid conveyor and before movement of the lifting arms downwardly;

Fig. 11 is a view looking downwardly upon the lid lifting mechanism and illustrating diagrammatically the pneumatic control system for the lid removing machine; and Fig. 12 is an enlarged view in vertical section through one of the control valves and one of the associated limit valves utilized in the control system of the present invention.

Figure 1:
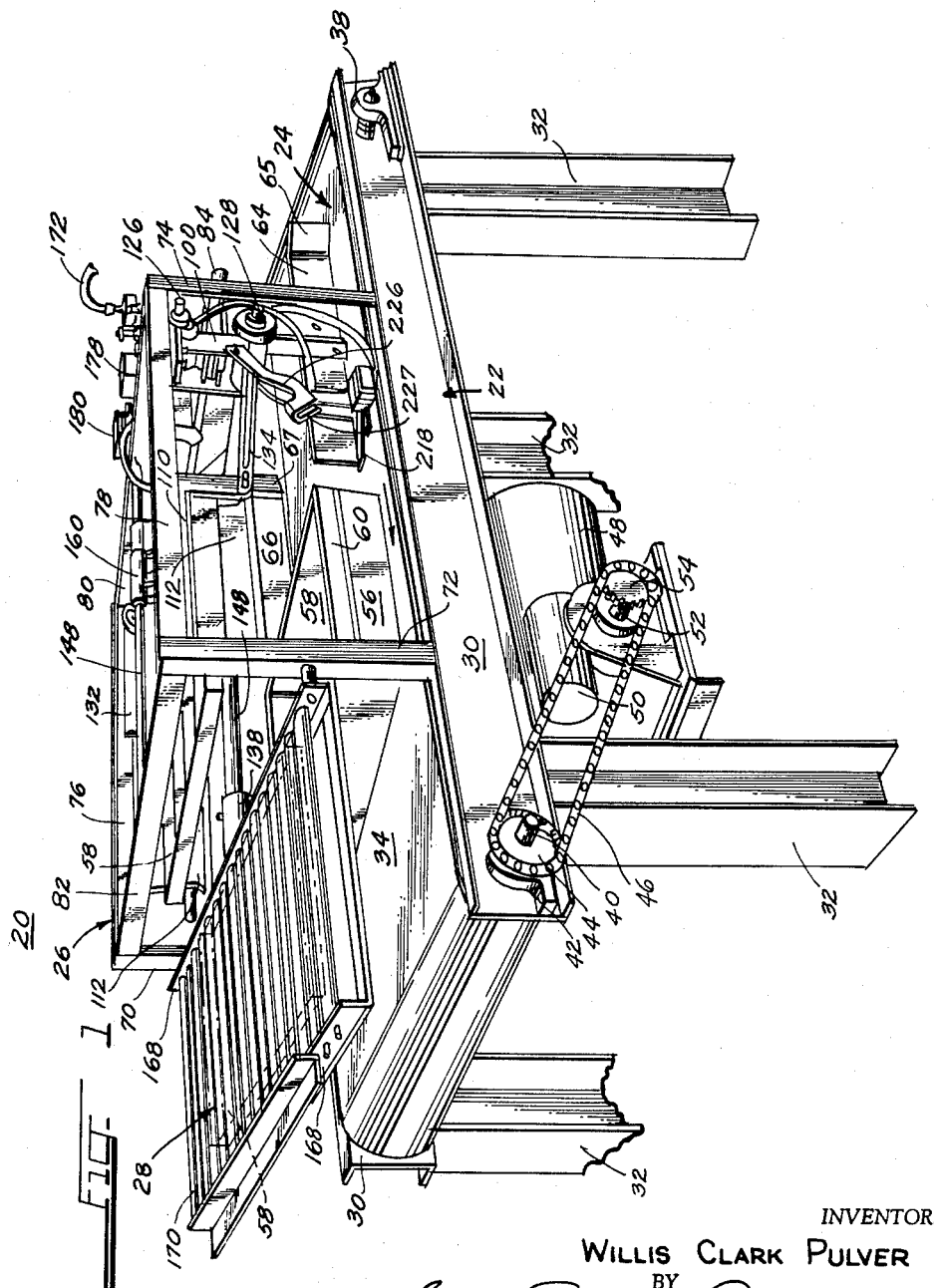
Fig. 1 is a perspective view of a lid removing machine constructed in accordance with and embodying the principles of the present invention, the machine being viewed from the discharge end thereof.
Figure 2:
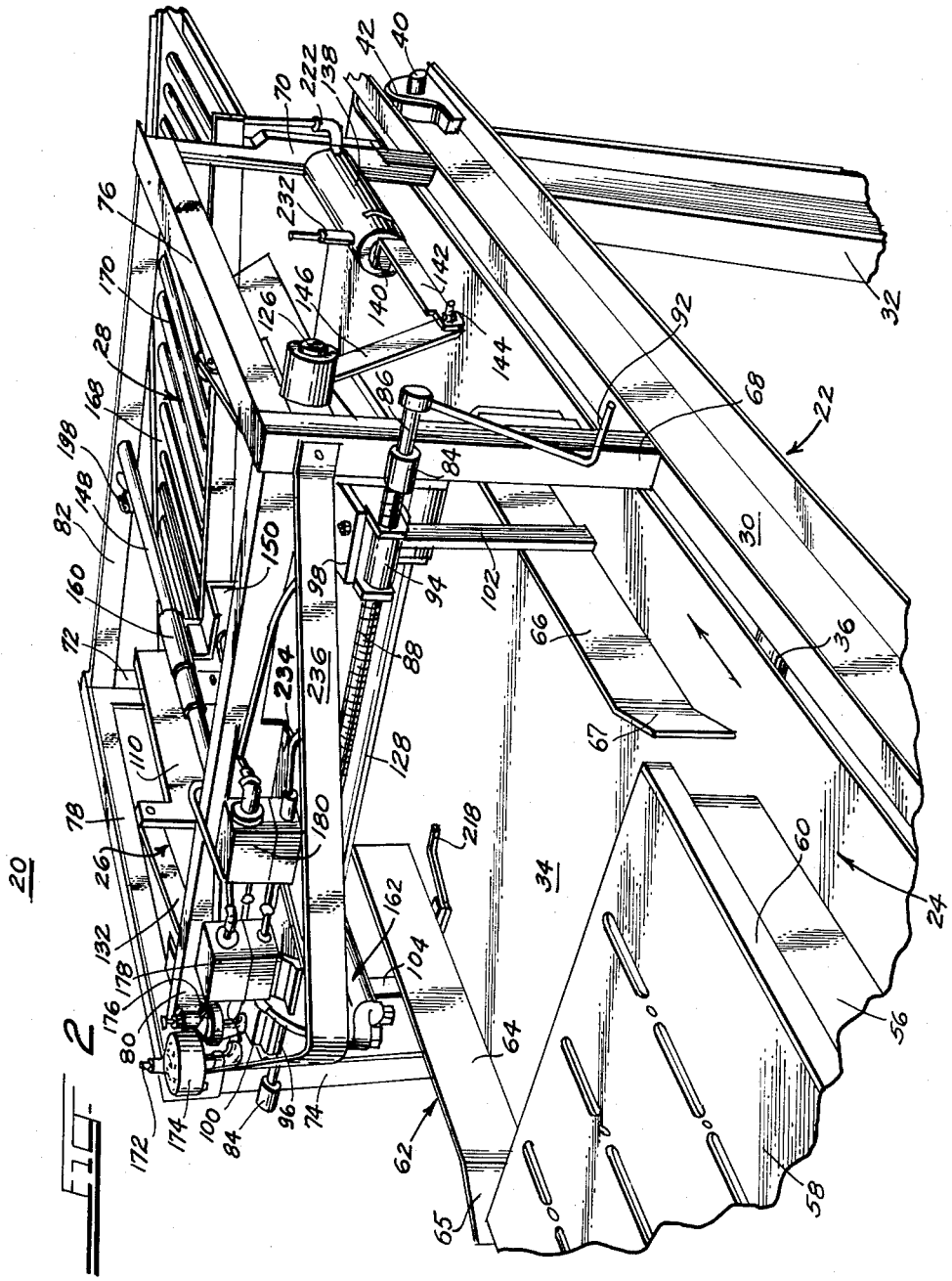
Fig. 2 is a perspective view on an enlarged scale with certain portions broken away of the feed end of the machine of Fig. 1.
Figure 3:
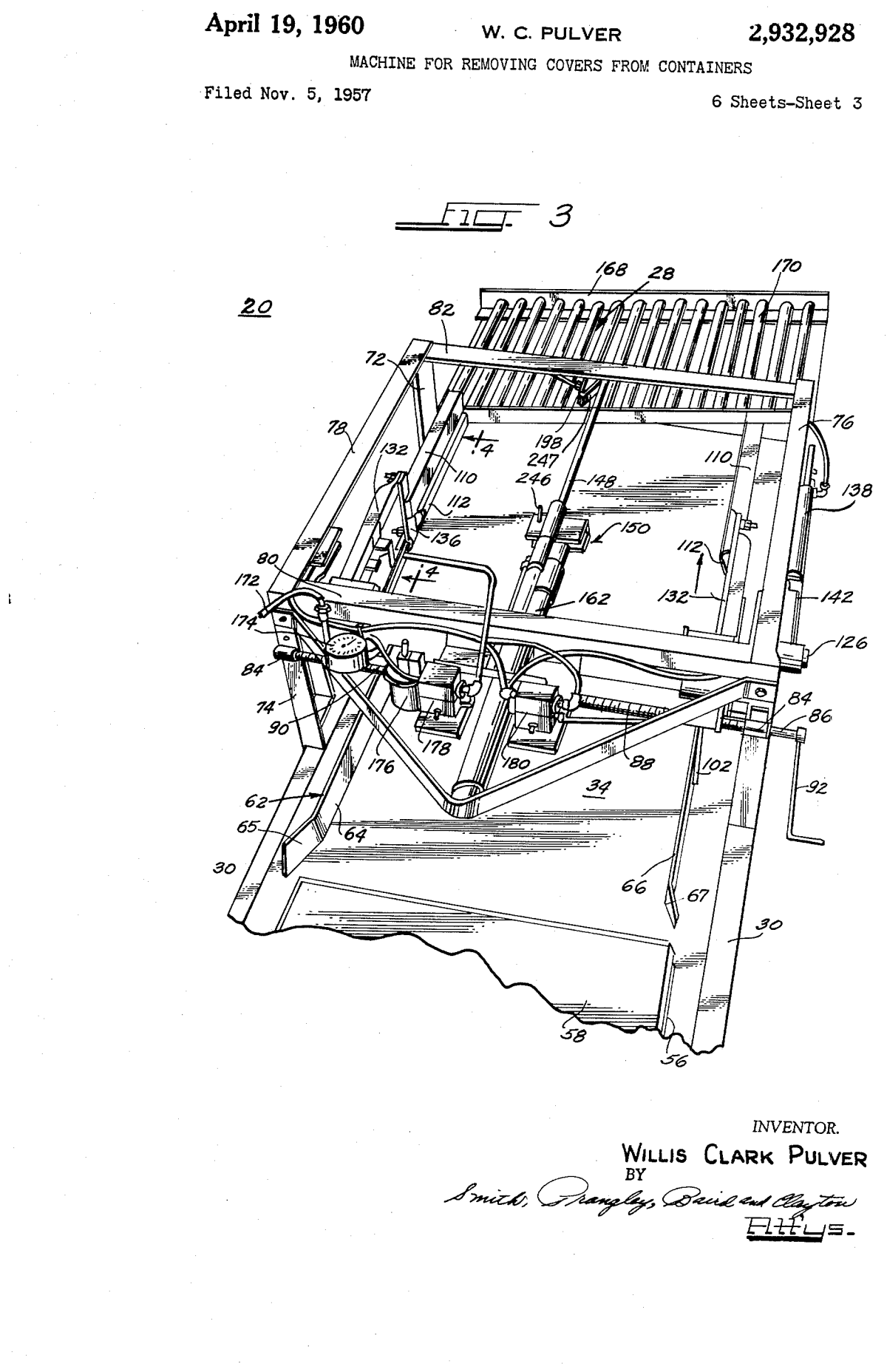

Referring now particularly to Figs. 1, 2 and 3 of the drawings, there is illustrated a machine generally designated by the numeral 20 which is made in accordance with and embodies the principles of the present invention. The machine 20 includes generally a frame 22, a pan conveyor 24, a lid lifting mechanism 26 and a gravity operated roller conveyor 28 useful, along with other conveyor apparatus not shown, for returning the removed lids to the pan filling position.

All of the operating parts of the machine are mounted upon the frame 22 which includes a pair of longitudinally extending and laterally spaced frame members 30 that are supported by four upright legs 32. Preferably the frame members 30 are channel-shaped as illustrated in the drawings.

Mounted upon the frame members 30 is the main conveyor 24 which is of the moving belt type. More specifically the conveyor 24 includes a flexible belt 34 which may be suitably mounted upon a plurality of support rollers 36 which hold the belt 34 in the illustrated position. The feed end of the conveyor belt 34 (positioned to the right in Fig. 1 and to the left in Fig. 2 of the drawings) is supported upon an idler roller suitably mounted on the frame members 30 as by bearing blocks 38. The discharge end of the conveyor belt 34 (the left hand end as viewed in Fig. 1 and the right hand end as viewed in Fig. 2 of the drawings) is supported upon a roller mounted on a shaft 40. The shaft 40 is suitably journalled upon the frame members 30 as by a pair of pillow blocks 42. One end of the shaft 40 (see Fig. 1) is provided with a sprocket 44 engaging with a driven chain 46 whereby to provide a suitable drive mechanism for the conveyor belt 34. The drive for the chain 46 is derived from a drive motor 48 which is connected through a suitable gear reducing mechanism 50 to an output drive shaft 52. There is mounted on the outer end of the drive shaft 52 a sprocket 54 which suitably engages the chain 46 to drive the shaft 40 and the attached conveyor belt 34.

The machine 20 is particularly adapted to remove covers or lids from baking pans for bread of the pullman or sandwich style, as has been explained above. Such a bread pan is illustrated in the drawings and particularly includes a substantially rectangular pan 56 (see Fig. 1) which may have four separate loaf receiving compartments therein, with the longitudinal axes thereof in alignment with the direction of movement of the conveyor belt 34. Mounted on the pan 56 is a cover or lid 58 which is substantially flat and has an area larger than that of the pan 56. Accordingly, the edges of the lid 58 extend beyond the sides of the pan 56 and are provided with downwardly extending flanges 60 (see Fig. 6 also). The lid lifting mechanism 26, which will be described more fully hereafter, is adapted to move the lid 58 by engaging beneath the longitudinally extending side flanges 60 thereof.

The bread pans 56, with the lids 58 thereon, are moved from the baking ovens onto the conveyor belt 34. Accordingly, the pan 56, the loaves of bread contained therein, and the lid 58 are all hot. The hot pan 56 with the lid 58 thereon is moved along by the conveyor belt 34 to the right as viewed in Fig. 2 of the drawings and upwardly as viewed in Fig. 3 of the drawings.

In order to insure that the pan 56 and the lid 58 are properly positioned for engagement with the lid removing mechanism 26, an aligning and guide mechanism, generally designated by the numeral 62, is provided. The guide mechanism 62 includes a pair of longitudinally extending lateral guide members 64 and 66 which are suitably supported upon a subframe mounted upon the main machine frame 22. The forward ends of the members 64 and 66 have outwardly directed portions 65 and 67 to aid in centering misaligned pans. More specifically the subframe includes four upstanding frame members or posts 68, 70, 72 and 74 which are mounted upon the longitudinal frame members 30. The upper ends of the posts are interconnected by a pair of longitudinally extending frame members 76 and 78 and by a pair of transversely extending frame members 80 and 82. The posts 68 and 74 each carry journals 84 which rotatably receive the ends of a rod 86 extending transversely of the conveyor belt 34. The major portion of the rod 86 positioned between journals 84 is threaded, the right hand portion of the rod 86 being threaded with for example right hand thread as at 88 and the left hand portion threaded with left hand thread as at 90. Mounted on the left hand end of rod 86 as viewed in Fig. 2 of the drawings is a crank 92 which can be manually operated to turn rod 86.

Mounted upon the threaded portions of rod 86 are threaded nuts 94 and 96, the threaded nut 94 engaging the threaded portion 88 and the nut 96 engaging the threaded portion 90. The nut 90 carries a movable frame 98 and the nut 96 carries a similar movable frame 100. Depending downwardly from the frames 98 and 100 are vertical hangers 102 and 104, respectively, which support the guide members 66 and 64, respectively. By turning the rod 86 using the crank 92, the guide members 64 and 66 can be moved inwardly toward each other or outwardly away from each other simultaneously and by like amounts. As will be described more fully hereinafter, such movement of the guide members 64 and 66 also automatically adjusts the lid lifting portions of the mechanism 26 whereby to assure alignment of the pan 56 and the associated lid 58 with the operating members of the lid lifting mechanism 26.

Referring now more particularly to Figs. 3 through 6 of the drawings, the construction of the lid removing mechanism 26 will be described in detail. Lifting of the lid 58 from the pan 56 is accomplished by a pair of arms 110 which carry thereon catch or gripping members 112 which extend downwardly therefrom and are adapted to engage beneath the edges of the lid flanges 60. Referring more particularly to Fig. 6 of the drawings, it will be seen that each arm 110 has the gripping member 112 thereof mounted on the face thereof disposed away from the associated lid 58. Each gripping member 112 includes a mounting portion 114 which has formed therein apertures through which extend a plurality of studs 116 which are fixedly attached to the arm 110 and are provided with an outer head 118 thereon. A spring 120 under compression is disposed between the head 118 and the mounting portion 114 about the stud 116. This mounting permits the mounting portion 114 to be moved away from the arm 110 against the urging of the spring 120 and in addition to be tilted with respect thereto.

Extending inwardly from the mounting portion 114 is a lid flange engaging flange 122 which extends inwardly toward the lids 58 and is adapted to be disposed beneath the flanges 60 of a lid 58. Formed integral with the flange 122 and extending therefrom outwardly with respect to conveyor 34 is a camming flange 124. The function of the camming flange 124 is to pivot and move the upper end of the mounting portion 114 away from arm 110 whereby to move the lifting flange 122 to the left as viewed in Fig. 6 whereby to permit positioning of the lifting flange 122 beneath the lid flange 60. More specifically, the camming flange 124 is moved to the left by engagement with a lid 58 upon movement of the arm 110 downwardly from the position shown by solid lines in Fig. 6 to that shown by dashed lines therein. In the lowermost position of the arm 110, the lifting flange 122 is disposed below the lid flange 60 as is illustrated by dashed lines in Fig. 6.

To obtain suitable lifting movement of a lid 58, it is desirable that the arms 110 be moved upwardly and forwardly in the direction of movement of the conveyor belt 34 with the arms 110 and the lid 58 carried thereby held in substantially a horizontal position. To this end a parallel linkage mechanism is provided to mount and move the arms 110. In addition it is desirable that the arms 110 and the mounting parts therefor be adjustable simultaneously with the guide members 64 and 66 and to this end these parts are mounted upon the frames 98 and 100. Support is provided for the lifting arms 110 on the subframe in the form of a pair of transversely disposed shafts 126 and 128 (see Figs. 1, 4 and 5, particularly) mounted on the subframe posts 68 and 74. A pair of parallel plates 130 is mounted on subframes 98 and 100 and carries bearings therein for the shafts 126 and 128. Mounted upon the shaft 126 for movement therewith is a first set of parallel links 132 and a second pair of links 134 is pivoted about the shaft 128 (see particularly Fig. 4 of the drawings). The ends of links 132 and 134 disposed away from the shafts 126 and 128 are pivotally interconnected by a bar 136. The arms 110 described above are fixedly mounted on the bars 136 and extend outwardly therefrom and substantially perpendicular thereto. By the above described parallel linkage mechanism, the bar 136 is maintained in a vertical position during movement between the positions illustrated in solid and dashed lines, respectively, in Fig. 4 and consequently the arms 110 and the attached gripping members 112 are maintained in a horizontal position during movement thereof. Furthermore as may be seen from Fig. 4 of the drawings, the movement of the arms 110 from the lower position to the upper position thereof is accompanied by a component of motion forwardly or to the right as seen in Fig. 4 and in the same direction as the conveyor belt 34. As a result, the forward component of the upward movement of the arms 110 and the associated pan lid can be adjusted to be substantially equal to the speed of the conveyor belt 34 whereby to facilitate removal of the pan lid.

The necessary vertical movement of the rams 110 is accomplished by rotating the upper shaft 126. To this end a hydraulic motor of the expansion-contraction type has been provided including a hydraulic cylinder 138 having a piston (not shown) which carries and drives a piston rod 140. Attached to the outer end of the piston rod 140 is an arm 142 which is pivoted as at 144 to an upwardly directed arm 146 (see particularly Fig. 2 of the drawings). The upper end of the arm 146 is fixedly secured to the outer end of the shaft 126 whereby to rotate the shaft 126 when the arm 140 is pivoted. Preferably, the end of the hydraulic cylinder 138 directed toward the post 70 is pivoted thereto whereby to accommodate the described motion of the parts. Extension of the piston rod 140 from the position illustrated in Fig. 2 serves to lower the lifting arms 110 to the position illustrated by dashed lines in Fig. 4 of the drawings and retraction thereof to the position of the piston rod 140 illustrated in Fig. 2 serves to lift the arms 110 to the position illustrated by full lines in Fig. 4. A suitable hydraulic control system which will be described more fully hereinafter provides power for the necessary movement of the piston rod 140.

After the lid 58 has been lifted by the arms 110 to the upper position, it is desirable to move the lid 58 from the lifted position (such as that illustrated in Fig. 1 of the drawings) onto the gravity lid conveyor 28. There has been provided to accomplish this desired movement of lid 58 a lid pushing mechanism which is best illustrated in Figs. 3 and 5 of the drawings. Referring first to Fig. 3 of the drawings, a stationary guide rod 148 is provided and extends between the subframe members 80 and 82 and is disposed substantially centrally thereof and extends in a direction parallel to the direction of movement of the conveyor belt 34. Supported upon the rod 148 is a lid pusher member 150. More specifically, the pusher member 150 includes a vertical lid engaging plate 152 (see Fig. 5) adapted to engage the rear vertically extending flange 60 of a lid and includes a forwardly extending horizontal support plate 154 which is adapted to fit beneath the lower edge of the rear flange of an adjacent lid. Extending rearwardly from the plate 152 is a support member 156 from which extends upwardly a plate 158 that is integrally secured to a sleeve 160. The sleeve 160 receives the rod 148 therethrough and is slidable along rod 148 from the position illustrated by solid lines in Fig. 5 to that illustrated by dashed lines therein and further to a position disposed to the right of the dashed line position in Fig. 5. Such movement of the sleeve 160 carries with it the other parts of the pusher member 150.

The desired movement of the pusher member 150 is obtained from a hydraulic motor of the expansion-contraction type, the motor being generally designated by the numeral 162 (see Fig. 3 also). The motor 162 includes a cylinder 164 carrying therein a piston (not shown) having attached thereto a piston rod 166 extending out of the cylinder 164 and connected to the support member 156. Upon extension of the piston rod 166 from cylinder 164, the pusher member 150 is moved from the position illustrated by solid lines in Fig. 5 to the right therefrom such as to a position illustrated by dashed lines therein. Such movement of the pusher member 150 is effective to push a pan lid 58 from the gripping and lifting members 112 onto the gravity conveyor 28. Retraction of the piston rod 166 into the cylinder 160 serves to move the pusher member 150 to the position illustrated by full lines in Fig. 5.

Referring now to Fig. 1 of the drawings, it will be seen that the conveyor 28 is suitably mounted on the subframe posts 70 and 72 adjacent the discharge end of the machine 20. The conveyor 28 is provided with the usual longitudinal frame members 168 upon which is supported a plurality of conveyor rollers 170. The frame members 168 are inclined with respect to the horizontal and, accordingly, the conveyor 28 will serve to move the lids 58 downwardly therealong to a discharge point which is preferably a bake pan loading station (not shown). The uppermost portion of the conveyor 28 is positioned well below the lowermost edge of a lid 58 mounted on and carried by the lifting arms 110. As a result the movement of the pusher member 150 will serve to push a lid 58 from the arms 110 onto the gravity conveyor 28.

It is desirable that the operation of the various parts described above be automatic. To this end a suitable pneumatic control system has been provided. The pneumatic control system is best illustrated by reference to Fig. 11 of the drawings and the sequential operation of the parts will be described in conjunction with the diagrammatic views in Figs. 7 through 10 of the drawings. The system is powered by air derived from a suitable supply (not shown) through a main line 172. The usual air regulator and guage 174 and air lubricator 176 are provided. The air is utilized to actuate two pneumatic valves generally designated by the numerals 178 and 180. The valve 178 is utilized to operate the hydraulic motor 162 which controls the pusher member 150. The valve 180 controls the operation of the hydraulic motor which moves the lifting arms 110 and which includes the hydraulic cylinder 138. The desired mode of operation of the valves 178 and 180 is achieved by controlling the valves by limit or bleeder valves as will be more fully described hereinafter, each main valve being controlled by two bleeder valves.

The valves 178 and 180 and the associated bleeder valves are identical in construction and, accordingly, only the details of construction of the valve 178 and the associated bleeder valves will be described in detail. Referring particularly to Figs. 11 and 12 of the drawings, it will be seen that the valve 178 includes a housing 182. One side of the housing 182 has a connection 184 therein which is adapted to be connected through a line 186 to the main air supply line 172 (see Fig. 11). The connection 184 terminates in a passage 188 in the body 182 which in turn communicates with passages 190 and 192 extending laterally from the body 182. A stemmed shuttle 194 is provided which can be moved to block either of the passages 190 or 192 depending upon the position thereof.

The shuttle 194 is mounted on and moved by a shiftable piston 196 which is mounted to move laterally in the housing 182 as viewed in Fig. 12. Movement of the piston 196 is controlled by a pair of bleeder valves 198 and 200. Each of these bleeder valves such as the valve 200 includes a body 202 having an opening therein connecting through a line 204 with a coupling 206 mounted in the housing 182. The line 204 is in pneumatic communication with one end of the piston 196. The housing 202 has openings 208 therein which can be placed in communication with the line 204. The openings 208 can be and are normally closed by means of a valve stem 210 which when depressed into the body 202 provides communication between the line 204 and the openings 208. A spring 211 holds the stem 210 normally closed.

When the bleeder valves are closed such as by the stem 210 thereof, the pressure on the associated side of the piston 196 builds up. Movement of the piston 196 is permitted if the stem 210 of valve 200, for example, is depressed whereby to release the air pressure from the associated side of the piston 196. This results in a pressure differential tending to move the piston 196 to the right as viewed in Fig. 12. This will move the shuttle 194 to a position such that no air pressure is applied through the passage 190 whereas the passage 192 will be directly connected to the air pressure in the line 172. Accordingly, a pneumatic device connected to the passage 192 will be actuated. Even though the valve stem 210 is subsequently released, the piston 196 and the associated parts will remain in the assumed position until the bleeder valve 198 has the plunger or stem 212 thereof depressed whereby to open the bleeder valve 198. Opening of the bleeder valve 198 will cause a pressure decrease on the adjacent side of the piston 196 which will move it to the left as viewed in Fig. 12. Such movement of the piston 196 will cut off the air supply to the passage 192 and will supply the full air pressure from the line 172 to the passage 190.

There is diagrammatically illustrated in Fig. 11 of the drawings the manner in which the valves 178 and 180 and the associated bleeder valves are arranged to provide for automatic operation of the lid removing machine 20. The solid single lines in this figure of the drawings indicate valve and hydraulic cylinder supply lines and the dashed lines indicate bleeder valve lines.

Referring first to the operation of the lifting arm actuating cylinder 138, this hydraulic motor is controlled by the valve 180. More specifically, the main air supply line 172 is connected through a line 214 to the valve 180. A bleeder valve 216 is connected through a line 217 to the valve 180 and is positioned adjacent the edge of conveyor belt 34. The bleeder valve 216 is mounted to be actuated by a control lever 218 which normally assumes the position illustrated by solid lines in Fig. 11 and is held in that position by a biasing spring. Pivoting of the control lever 218 to the position illustrated by dashed lines moves it out of contact with the bleeder valve 216. Return movement of the lever 218 actuates the bleeder valve 216 whereby to open the bleeder valve. Opening of the bleeder valve 216 shifts the piston in the valve 180 in a direction to make a connection to a hydraulic control line 220 which is connected to the upper end of the hydraulic cylinder 138 as viewed in Fig. 11, the connection being designated by the numeral 222. Introduction of air under pressure into the connection 222 of the cylinder 138 serves to move the associated piston rod out of the cylinder so that the parts assume the position illustrated in Fig. 4 of the drawings in dashed lines with the lid lifting arms 110 in the lowered position. Because of the operation of the valve 180 as has been explained above, the parts would remain in this position indefinitely unless the valve 180 is subsequently actuated.

Subsequent actuation of the valve 180 is actually achieved by means of a bleeder valve 224 which is mounted upon a bracket 226 on the movable frame 100 and is provided with an actuator 227 (see Fig. 1). As is diagrammatically illustrated in Figs. 4 and 7 through 10 of the drawings, the bleeder valve 224 is actuated by a cam member 228 mounted on the adjacent lower parallel link 134. Contact between the cam member 228 and the bleeder valve 224 occurs just after the arms 110 have engaged the associated lid 58. Actuation of the bleeder valve 224 changes the conditions within the valve 180 whereby to apply pneumatic pressure through a line 230 to a connection 232 at the other end of the hydraulic cylinder 134. Application of air pressure to the connection 232 serves to move the piston rod 140 into the cylinder 138 whereby to lift the arms 110 and the pan lid thereon. The parts will remain in this position until the bleeder valve 216 has been released by the control lever 218 and thereafter subsequently actuated thereby. The actuator 227 assures that the valve 224 is actuated only once by movement of the link 134 thereagainst.

The operation and control of the hydraulic motor 162 whereby to move the pusher member 150 toward and away from the gravity conveyor 128 will now be described in detail. The valves 178 and 180 and the motor 162 are mounted upon a plate 234 and a V-shaped strap 236 which are mounted upon frame posts 68 and 74. When the arms 110 are in the lowered position the pusher member 150 is retracted or positioned as indicated in Fig. 11 of the drawings. When the arms 110 rise with a lid supported thereon upon the lid supporting flanges 122, it is desirable to actuate the pusher member 150 upon arrival of the lid in position to be pushed thereby. To this end the bleeder valve 200 is supported by an arm 240 upon the subframe 100 (see Figs. 4 and 7 also). A one way actuating cam member 242 is mounted on the parallel link 132 in position to contact the bleeder valve 200 to cause the pusher member 150 to engage the lid 58 carried by the arms 110. More specifically, the bleeder valve 200 is connected to the control valve 178 through the line 204. Actuation of the bleeder valve 200 applies hydraulic pressure through a line 244 to a connection 246 to the hydraulic motor 162. Introduction of air into the connection 246 serves to move the pusher member 150 against the lid 58 whereby to slide it along the support flanges 122 onto the gravity conveyor 28. The cam member 242 is so constructed that it will not actuate the valve 200 when the arms 110 are lowered or are moving downwardly.

As the pusher member 150 arrives at the extreme end of its pushing stroke, a member 246 mounted on the sleeve 160 presses against an actuator 247 which contacts the bleeder valve 198 which is connected by means of a line 248 to the valve 178. Actuation of the bleeder valve 198 applies air pressure through a line 250 to a connection 252 for the hydraulic motor 162. This causes the pusher member 150 to be retracted. The actuator 247 assures that the valve 198 is actuated only once for each movement of the member 150 to that end of the machine.

Referring now specifically to Figs. 7 through 10 of the drawings, an explanation of the sequential operation of the machine 20 will be given. The motor 48 is started whereby to cause operation of the conveyor belt 34. The crank 92 is turned whereby to adjust the guide mechanism 62 and particularly the guide members 64 and 66 thereof and the arms 110 to accommodate the size of pan 56 which it is desired to pass upon the conveyor belt 34. At the beginning of operation, the parts are in the position illustrated in Fig. 7 of the drawings. More specifically, the lifting arms 110 are in the upper position and the forward end of the first pan 56 has just engaged the control lever 218.

As the pan 56 is conveyed to the right on belt 34, the rear end of the pan 56 eventually clears the control lever 218 whereby to release the control lever 218. The release of the control lever 218 causes operation of the bleeder valve 216. This applies air pressure to the cylinder 138 whereby to cause rotation of the shaft 126 whereby to lower the arms 110. During downward movement of the arms 110, the gripping member 112 and particularly the camming flange 124 thereof contacts the upper edge of the lid 58 and is cammed outwardly. Continued movement of the arms 110 downwardly permits the springs 120 to move the flanges 122 beneath the lower edges of the lid flanges 60.

Immediately upon gripping of the lid 58 by the gripping members 112, the camming member 228 on the link 134 engages the bleeder valve 224. This causes operation of the valve 130 whereby to apply air pressure to the other end of the hydraulic cylinder 138. This causes the arms 110 to be lifted from the position illustrated in Fig. 8 toward the position illustrated in Fig. 9. During the lifting movement, the lid 58 is moved forwardly as well as upwardly and preferably the forward component of the movement thereof is substantially equal to the horizontal movement of the pan 56 whereby to facilitate removal of the lid 58. Because of the automatic operation of the parts to move the arms 110, these arms are moved rapidly from the upper to the lower position and then up again. As a consequence the pan 56 actually moves only a short distance forwardly during the actual removal of the lid 58 therefrom.

After the arms 110 approach the upper position as illustrated in Fig. 9 of the drawings, the camming member 242 contacts and actuates the bleeder valve 200. This causes the pusher member 150 to be moved to the right toward the gravity conveyor 28 whereby to slide the lid 58 off of the support arms 110.

At the end of the forward travel of the pusher member 150, the member 246 contacts the bleeder valve 198 whereby to cause reversal of the hydraulic motor 168 and movement of the pusher member 150 to the left from the position illustrated in Fig. 10 of the drawings to that illustrated in Fig. 7 of the drawings.

At this time the next pan 56 is moving into engagement with the control lever 218 and the parts are retained in the position illustrated in Fig. 7 until the succeeding pan has cleared the control lever 218. At that time the operation described above is repeated.

The removed lids are fed along the gravity conveyor 28 to any convenient point such as the dough loading station and the pans 56 with the loaves of bread therein are carried by the conveyor belt 34 to the next processing step (not shown) which may be, for example, a pan emptying station.

It will be seen that there has been provided a lid removing machine and method which fulfills all of the objects and advantages set forth above. Although a preferred form of the invention has been shown in the drawings for purposes of illustration, it is to be understood that various changes and modifications can be made therein without departing from the spirit and scope of the invention. Accordingly, the invention is to be limited only as set forth in the following claims.

What is claimed is:

1. A machine for removing lids from containers comprising, a conveyor continuously to convey the containers with lids thereon along a path, lid lifting mechanism mounted adjacent said path to remove the lids from the containers on said conveyor, said mechanism including a pair of lid gripping means for gripping opposite lid edges extending in the direction of movement of said conveyor, said mechanism also including pivoting linkage for permitting movement of said lid gripping means into lid gripping position and in a lid removing direction, said pivoting linkage being so arranged as to provide said lid gripping means with a substantial component of movement in a direction parallel to the direction of movement of said conveyor during the initial lid removing movement thereof, and control mechanism operable when a container is in proper position with respect to said lid lifting mechanism to cause operation thereof to remove the lid from the container while the container is continuously moved by said conveyor.

2. A machine for removing lids from containers comprising, a conveyor continuously to convey the containers with lids thereon along a rectilinear and horizontal path, lid lifting mechanism mounted adjacent said path to remove the lids from the containers on said conveyor, said lid lifting mechanism including a pair of lid gripping means for gripping opposite lid edges extending in the direction of movement of said conveyor, each of said means being engageable with an edge of a lid simultaneously at points widely spaced in the direction of conveyor movement, and control mechanism operable when a container is in proper position with respect to said lid lifting mechanism to cause operation thereof to remove the lid from the container while the container is continuously moved by said conveyor.

3. A machine for removing lids from containers comprising, a conveyor to carry the containers with the lids thereon, drive mechanism to drive said conveyor in a continuous and uninterrupted manner, and lid lifting mechanism mounted adjacent the path of travel of said conveyor to remove the lids from the containers on said conveyor while the containers are continuously and uninterruptedly moved by said conveyor, said lid lifting mechanism including a pair of lid gripping means for gripping opposite lid edges extending in the direction of movement of said conveyor, each of said means being engageable with an edge of a lid simultaneously at points widely spaced in the direction of conveyor movement, said mechanism also including parallel linkage for permitting movement of said lid gripping means downwardly into lid gripping position and upwardly in a lid lifting direction while maintaining said lid gripping means in fixed orientation.

4. A machine for removing lids from containers comprising, a conveyor to carry the containers with the lids thereon, drive mechanism to drive said conveyor in a continuous and uninterrupted manner, lid lifting mechanism mounted adjacent the path of travel of said conveyor to remove the lids from the containers on said conveyor, said lid lifting mechanism including a pair of lid gripping means for gripping opposite lid edges extending in the direction of movement of said conveyor, each of said means being engageable with an edge of a lid simultaneously at points widely spaced in the direction of conveyor movement, said mechanism also including parallel linkage for permitting movement of said lid gripping means downwardly into lid gripping position and upwardly in a lid lifting direction while maintaining said lid gripping means in fixed orientation, said parallel linkage being so arranged as to provide said lid gripping means with a substantial component of movement in a direction parallel to the direction of movement of said conveyor during the initial lid lifting movement thereof, and control mechanism operable when a container is in proper position with respect to said lid lifting mechanism to cause operation thereof to remove the lid from the container while the container is continuously and uninterruptedly moved by said conveyor.

5. A machine for removing lids from containers comprising, a conveyor continuously to convey the containers with lids thereon along a rectilinear and horizontal path, lid lifting mechanism mounted above said conveyor adjacent said path to remove the lids from the containers on said conveyor, said mechanism including a pair of lid gripping means for gripping opposite lid edges extending in the direction of movement of said conveyor, said mechanism also including pivoting linkage for permitting movement of said lid gripping means downwardly into lid gripping position and upwardly in a lid lifting direction, said pivoting linkage being so arranged as to provide said lid gripping means with substantial component of movement in a direction parallel to the direction of movement of said conveyor during the initial lid lifting movement thereof, and control mechanism operable when a container is in proper position with respect to said lid lifting mechanism to cause operation thereof to remove the lid from the container while the container is continuously moved by said conveyor.

6. A machine for removing lids from containers comprising, a conveyor continuously to convey the containers with lids thereon along a path, lid lifting mechanism mounted adjacent said path to remove the lids from the containers on said conveyor, said mechanism including a pair of lid gripping means for gripping opposite lid edges extending in the direction of movement of said conveyor, said lid gripping means including downwardly extending fingers spring biased toward each other and having tapered lower portions engageable by the edges of a lid for wedging the fingers away from each other and upwardly facing shoulders for engaging the lower surfaces of the edges of a lid, and control mechanism responsive to the presence of a container in proper position with respect to said lid lifting mechanism to cause operation of said lid lifting mechanism to remove the lid from the container while the container is moved by said conveyor in a continuous and uninterrupted manner.

7. A machine for removing lids from containers comprising, a conveyor continuously to convey the containers with lids thereon along a path, lid lifting mechanism mounted adjacent said path to remove the lids from the containers on said conveyor, control mechanism operable when a container is in proper position with respect to said lid lifting mechanism to cause operation thereof to remove the lid from the container while the container is continuously moved by said conveyor, lid shifting mechanism to remove a lid from said lid lifting mechanism, and a second control mechanism responsive to operation of said lid lifting mechanism to operate said lid shifting mechanism.

8. A machine for removing lids from containers comprising, a conveyor continuously to convey the containers with lids thereon along a path, lid lifting mechanism mounted adjacent said path to remove the lids from the containers on said conveyor, control mechanism operable when a container is in proper position with respect to said lid lifting mechanism to cause operation thereof to remove the lid from the container while the container is continuously moved by said conveyor, a conveyor for removed lids positioned adjacent said container conveyor, lid shifting mechanism to move removed lids from said lid lifting mechanism to said lid conveyor, and a second control mechanism responsive to operation of said lid lifting mechanism to operate said lid shifting mechanism.

9. A machine for removing lids from containers comprising, a first conveyor for containers having lids thereon, drive mechanism to move said first conveyor along a predetermined path, lid lifting mechanism mounted adjacent said path in position to remove the lids from the containers on said first conveyor, a second conveyor for lids mounted adjacent the path of said first conveyor, lid shifting mechanism to move a lid from said lid lifting mechanism to said second conveyor, first control mechanism responsive to the presence of a container on said first conveyor in proper position with respect to said lid lifting mechanism to cause operation thereof to remove the lid from the container while the container is moved in a continuous and uninterrupted manner, and second control mechanism responsive to operation of said lid lifting mechanism to cause said lid shifting mechanism to move the removed lid from said lid lifting mechanism onto said second conveyor.

10. A machine for removing lids from containers comprising, a first conveyor for containers having lids thereon, drive mechanism to move said first conveyor along a predetermined path, lid lifting mechanism mounted adjacent said path in position to remove the lids from the containers on said first conveyor, a second conveyor for lids mounted adjacent the path of said first conveyor, lid shifting mechanism to move a lid from said lid lifting mechanism to said second conveyor, first control mechanism mounted adjacent said first conveyor in position to contact a container thereon and responsive to contact with a container to cause operation of said lid lifting mechanism to remove the lid from the container while the container is conveyed in a continuous and uninterrupted manner, and second control mechanism responsive to operation of said lid lifting mechanism to cause said lid shifting mechanism to move the removed lid from said lid lifting mechanism onto said second conveyor.

11. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, and control mechanism operable when a container is in proper position with respect to said arms to move said arms to said first position to engage a lid and thereafter to said second position and in the direction of movement of said conveyor to remove the lid from the container.

12. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, resilient gripping members mounted on said arms to engage a lid, and control mechanism operable when a container is in proper position with respect to said arms to move said arms to said first position to engage a lid and thereafter to said second position and in the direction of movement of said conveyor to remove the lid from the container.

13. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, gripping members resiliently mounted on said arms to engage the edges of the lids parallel to the direction of movement of said conveyor, parallel linkage mechanism mounting said arms to cause said gripping members to maintain a predetermined angularity with respect to said conveyor and to impart a component of movement to said gripping members in the direction of movement of said conveyor, and control mechanism operable when a container is in proper position with respect to said gripping members to cause said gripping members to move to said first position to engage a lid and thereafter forwardly and to said second position to remove the lid from the container while the container is moved by said conveyor in a continuous and uninterrupted manner.

14. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, resilient gripping members mounted on said arms to engage a lid, means to adjust the distance between said lifting arms and said gripping members, and control mechanism operable when a container is in proper position with respect to said arms to move said arms to said first position to engage a lid and thereafter to said second position and in the direction of movement of said conveyor to remove the lid from the container.

15. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, resilient gripping members mounted on said arms to engage a lid, guide members mounted adjacent said conveyor and before said lifting arms to guide the containers into proper position with respect to said lifting arms, and control mechanism operable when a container is in proper position with respect to said arms to move said arms to said first position to engage a lid and thereafter to said second position and in the direction of movement of said conveyor to remove the lid from the container.

16. A machine as set forth in claim 15, wherein said lifting arms and said guide members are interconnected and means is provided simultaneously to adjust said gripping members and said guide members to accommodate different sizes of containers therebetween.

17. A machine for removing lids from containers comprising, a conveyor to carry the containers with lids thereon along a predetermined path, drive mechanism to move said conveyor in a continuous and uninterrupted manner, a pair of lifting arms shiftably mounted adjacent said conveyor and movable between a first position adjacent said conveyor and a second position away from said conveyor, gripping members resiliently mounted on said arms to engage the edges of the lids parallel to the direction of movement of said conveyor, parallel linkage mechanism mounting said arms to cause said gripping members to maintain a predetermined angularity with respect to said conveyor and to impart a component of movement to said gripping members in the direction of movement of said conveyor, first control mechanism operable when a container is in proper position with respect to said gripping members to cause said gripping members to move to said first position to engage a lid and thereafter forwardly and to said second position to remove the lid from the container while the container is moved by said conveyor in a continuous and uninterrupted manner, a lid conveyor mounted adjacent said container conveyor, a lid shifting mechanism to move a lid from said gripping members onto said lid conveyor, and second control mechanism operable when said lifting arms are in the proper position to cause operation of said lid shifting mechanism.

References Cited in the file of this patent

UNITED STATES PATENTS

| | | |
|---|---|---|
| 2,346,118 | Stover | Apr. 4, 1944 |
| 2,510,568 | Fouse | June 6, 1950 |
| 2,668,002 | Temple | Feb. 2, 1954 |
| 2,683,560 | Keller | July 13, 1954 |
| 2,735,602 | Wise | Feb. 21, 1956 |